(12) United States Patent
Coen

(10) Patent No.: US 7,876,964 B2
(45) Date of Patent: Jan. 25, 2011

(54) METHOD FOR ASSOCIATING A DIGITAL IMAGE WITH A CLASS OF A CLASSIFICATION SYSTEM

(75) Inventor: Günther Coen, Velbert (DE)

(73) Assignee: Betriebsforschungsinstitut VDEH-Institut Für Angewandte Forshung GmbH, Düsseldorf (DE)

( * ) Notice: Subject to any disclaimer, the term of this patent is extended or adjusted under 35 U.S.C. 154(b) by 363 days.

(21) Appl. No.: 11/574,698

(22) PCT Filed: Sep. 1, 2005

(86) PCT No.: PCT/EP2005/009427

§ 371 (c)(1),
(2), (4) Date: Nov. 6, 2008

(87) PCT Pub. No.: WO2006/027158

PCT Pub. Date: Mar. 16, 2006

(65) Prior Publication Data

US 2009/0214123 A1 Aug. 27, 2009

(30) Foreign Application Priority Data

Sep. 3, 2004 (DE) .................. 10 2004 043 149
Jan. 10, 2005 (DE) .................. 10 2005 001 224

(51) Int. Cl.
*G06K 9/62* (2006.01)
*G06K 9/68* (2006.01)
(52) U.S. Cl. .................. 382/224; 382/225; 382/226; 382/227; 382/228
(58) Field of Classification Search ................. 382/159, 382/160, 165, 169, 170, 181, 224, 225, 226, 382/227, 228; 706/15, 19, 20, 22, 41; 700/47, 700/50
See application file for complete search history.

(56) References Cited

FOREIGN PATENT DOCUMENTS

EP 0649 113 A2 4/1995
EP 0854 435 A2 7/1998

OTHER PUBLICATIONS

Ming-Kuei Hu: "Visual Pattern Recognition by Moment Invariants", in: IRE Transactions on Infromastion Theory, Feb. 1962, pp. 179-187.
R.C.Gonzalez et al.: "Digital Image processing", in: Addison Wesley Publ. Company, 1992, pp. 514-518.

(Continued)

*Primary Examiner*—Brian Q Le
(74) *Attorney, Agent, or Firm*—Henry M. Feiereisen; Ursula B. Day

(57) ABSTRACT

Disclosed is a method for assigning the content of a digital image to a class of a classification system. Said method comprises the following steps: —a predetermined number of F numerical shape characteristics $\psi_m$ are determined; —the value of each shape characteristic of the F numerical shape characteristics determined for the image is compared to the value filed in a table for the respective shape characteristic, values for the individual numerical shape characteristics being allocated to each class in the table; —the class in which the F numerical shape characteristics determined for said image correspond best to the values of the numerical shape characteristics indicated in the table for said class is output as the class into which the image that is to be recognized is classified.

22 Claims, 3 Drawing Sheets

Letter A: (centered, 96, normal)

Letter A: (centered, 96, 90° rotated)

Letter A: (centered, 48, normal)

OTHER PUBLICATIONS

H. Niemann: "Klassifikation von Mustern", in: Springer Verlag, 1983, pp. 200-204.

G. Coen: "Eine neue Methode der Musterkiassifizierung in der digitalen Bildverarbeitung", in: Deutsche gesellschaft für zerstörungsfreie Prüfung, yearly meeting, May 18, 2004.

S.O. Belkasim et al.: "Pattern Recognition With Moment Invariants: A Comparative Study And New Results", in: Pettern recognition, Elsevier, Kidlington, vol. 24, No. 12, Jan. 1991, pp. 1117-1138.

F. Mindru et al.: "Moment Invariants For Recognition Under Changing Viewpoint And Illumination", in: Computer Vision and Image Understanding, Academic Press, San Diego, CA vol. 94, No. 1-3, Apr. 2004, pp. 3-27.

Letter A: (centered, 96, normal)

Letter A: (centered, 96, 90° rotated)

Letter A: (centered, 48, normal)

Letter B: (centered, 96, normal)

Letter B: (centered, 96, 90° rotated)

Letter B: (centered, 48, normal)

Letter C: (centered, 96, normal)

Letter C: (centered, 96, 90° rotated)

Letter C: (centered, 48, normal)

METHOD FOR ASSOCIATING A DIGITAL IMAGE WITH A CLASS OF A CLASSIFICATION SYSTEM

BACKGROUND OF THE INVENTION

The invention relates to a method for associating a digital image with a class of a classification system.

Automating error recognition based on optical analysis methods has become increasingly important with the increasing automation of industrial processes. Optical error recognition methods were performed in the past by quality assurance personnel, who inspected the object to be tested or an image representation of the object to be tested and identified possible errors. For example, x-ray images of weld seams are checked based on error types, such as for example tears, inadequate continuous welds, adhesion errors, slag, slag lines, pores, tubular pores, root notches, root errors, heavy-metal inclusions and edge offset. It is also known to inspect radioscopic images of cast parts to identify errors in the cast part, for example inclusion of impurities, inclusion of gases, bubbles, such as axial pores or spongy pores, fissures or chaplets. Because of these errors are of similar type, but may be different in their appearance and shape, more recent approaches in industrial error evaluation now associate errors with different classes, wherein the respective class contains errors of the same type. The industry standard EN 1435 describes, for example, the classification system for weld seam errors. According to this standard, the errors occurring in weld seams and identified by x-ray images are divided into the 30 different classes, for example classes for the error tear, such as longitudinal care or transverse tear, inadequate continuous welds, adhesion errors, foreign inclusions, such as slag, slag lines, gas inclusions, such as pores or tubular pores, or heavy-metal inclusions, undercuts, root notches, root errors, and edge offset. With increasing automation of these processes, there is now a push to achieve optical recognition of errors and association of these errors with predetermined classes through image analysis based on images that are recorded and stored using digital image recording techniques. Conventional automated error recognition methods based on digital images use a so-called "heuristic approach." With this approach, reference images are saved in an image processing unit and an attempt is made to through image comparison to associate the content of a digital image with one of these reference patterns.

In other technical fields, image content is associated with classes of a classification system, for example, for character recognition. In this case, for example, each letter forms its own class, so that for the capital letter alphabet there exist, for example, 26 classes, namely for the characters (A, B, C, D, E, F, G, H, I, J, K, L, M, N, O, P, Q, R, S, T, U, V, W, X, Y, Z). The OCR technologies (Optical Character Recognition) analyze the digital image of a printed page generated by a scanner and associate the individual letter symbols with the predetermined classes. As a result, the OCR technology "recognizes" the text and can transfer the classified characters to a text processing program as an editable sequence of letters. The granted European patents 0 854 435 B1 and 0 649 113 B1 are directed, for example, to the technical field of character recognition (Optical Character Recognition).

The technique of image processing can be more and more divided into areas with different sub-processes, whose technologies develop independent of each other. These areas are frequently organized into image preprocessing, image analysis, analysis of image sequences, image archiving and the so-called Imaging.

Image preprocessing is defined as the computer-aided improvement of the quality (processing: noise elimination, smoothing) of the corresponding digital image to facilitate visual recognition of the information content of this image by the viewer.

Image analysis is defined as the computer-aided evaluation of the information content of the corresponding digital image by automated and reproducible structuring, identification and comprehension of this image.

Analysis of image sequences is defined as the computer-aided evaluation of the information content of the respective sequence of digital images by automated and reproducible structuring, identification and comprehension of all individual images of this sequence and by automated and reproducible comprehension of the context of the sequence of individual images of this image sequence.

Image archiving is defined as the computer-aided compression and storage of the digital images together with indexed search descriptors from a controlled vocabulary.

Imaging is defined as the computer-aided generation of synthetic graphics and digital images for visualizing and describing the information content of complex processes on an image and symbol plane for the human observer.

The technique of associating the content of digital images with a class of the classification system is one method of image analysis, which can be divided into three subareas: segmentation, object recognition and image comprehension.

Segmentation is defined as of the automated and reproducible structuring of the respective digital images by separating the objects that are relevant for the analysis of the image from each other and from the image background. Object recognition is defined as the automated and reproducible classification of the separated objects. Image comprehension can be interpreted as the automated and reproducible interpretation of the respective digital image by context evaluation of the classified, separated objects. The technique of associating digital images with a class of a classification system is a method of object recognition.

Object recognition can be viewed as a subarea of pattern recognition, namely as the subarea of the pattern recognition which recognizes as patterns only two-dimensional objects in images.

Images are typically displayed as an image composed of pixels, whereby to display the image, the content of each pixel and its position in the image must be known. Depending on the content attribute, the image is can be divided into color images, grayscale images and binary images, wherein binary images have as content attribute, for example, only the values 0 and 1 for black and white, respectively.

One method frequently used in this technology for associating a digital image with a class of a classification system, which was used successfully for decades for distinguishing military aircraft (friend-foe identification), is known from M. K. Hu: "Visual Pattern Recognition by Moment Invariants", IRE Trans. Info. Theory, vol. IT-8, 1962, pp. 179-187 and R. C. Gonzalez, R. E. Woods: "Digital Image Processing", Addison-Wesley Publishing Company, 1992, pp. 514-518. Based on the so-called normalized centralized axial moments obtained through image analysis techniques from the image display, a finite sequence $\{\phi_I\}$ of 7 dimensionless shape attributes can be generated for an arbitrary, separated, in limited, two-dimensional object in a binary image by scaling. If the 7 sequential elements $\Phi_I$ ($0 \leq I \leq I_0 = 7$) are viewed as the coordinates of an attribute vector $\Phi=(\Phi_1, \Phi_2, \Phi_3, \Phi_4, \Phi_5, \Phi_6, \Phi_7)$ which is an element of a 7-dimensional Euclidian attribute space $M_7$, then this method induces an object recognition in this 7-dimensional attribute space $M_7$. The method has the advantage, compared with object recognition by heuristic attributes, that classification occurs exclusively with attribute vectors $\Phi=(\Phi_1, \Phi_2, \Phi_3, \Phi_4, \Phi_5, \Phi_6, \Phi_7)$ whose coordinates are dimensionless shape attributes, so that in particular size differences between the objects to be recognized and the objects used for generating the comparison table become unimportant. In addition, a unique sequential order with respect to the relevance of the attributes for the object recognition and the digital image processing is defined within the set of the dimensionless shape attributes $\phi_1$ through the coordinate reference to the attribute vector $\Phi$ so that it is immediately clear that the first attribute $\Phi_1$ is the most important.

However, this method still has disadvantages because the number of the available dimensionless shape attributes is limited to 7 and a misclassification can therefore occur with complex objects, if two different classes have identical values for the 7 dimensionless shape attributes.

SUMMARY OF THE INVENTION

It is an object of the invention to provide a method for associating the content of a digital image with a class of a classification system, to make it possible to reliably recognize also symbols having a more complex shape.

In accordance with the method of the invention, at least one group of a predetermined number of F numerical shape attributes $\psi_m$ with m as a running index is determined wherein $\psi_m$ is a transformed expression of the moment $\overline{\rho^m}$, and $\overline{\rho^m}$ is derived from $$\overline{\rho^m} = k_m \overline{R^m}$$

$$\text{with } k_m = \frac{(m+2)}{2}\left(\frac{\pi}{|A|}\right)^{\frac{m}{2}}$$

$$A = m_{0,0} = \Delta a * \Delta b * \sum_{j=1}^{jmax} \sum_{i=1}^{imax} \text{data}[j, i]$$

$$\overline{R^m} = \frac{v_m}{v_0} = \frac{v_m}{m_{0,0}}$$

$$v_m = \Delta a * \Delta b * \sum_{j=1}^{jmax} \sum_{i=1}^{imax} (R(j, i))^m \text{data}[j, i]$$

$$R(j, i) = \sqrt{((i - 0, 5) * \Delta a - \overline{x})^2 + ((j - 0, 5) * \Delta b - \overline{y})^2}$$

$$\overline{x} = \frac{m_{1,0}}{m_{0,0}}$$

$$\overline{y} = \frac{m_{0,1}}{m_{0,0}}$$

$$m_{1,0} = (\Delta a)^2 * \Delta b * \sum_{j=1}^{jmax} \sum_{i=1}^{imax} (i - 0, 5) * \text{data}[j, i]$$

$$m_{0,1} = (\Delta b)^2 * \Delta a * \sum_{j=1}^{jmax} \sum_{i=1}^{imax} (j - 0, 5) * \text{data}[j, i]$$

where $\Delta a$ is the width of the pixel in the x-coordinate direction, $\Delta b$ is the width of the pixel in the y-coordinate direction, data [j, i] is the content attribute of the pixel at the position $(y_j, x_j)$ and m=a number running from 1 to F as a counter of the shape attributes. The value of each shape attribute of the F plurality of shape attributes intended for the picture in the at least one group is compared with the value saved in a table for the respective shape attribute of this group, wherein values for the individual numerical shape attributes of this group in the table are associated with each class. The class is output as an association class in which the image to be recognized is classified, in which the F numeric shape attributes intended for the picture best correspond to the values of the numeric shape attributes recorded in the table for this class.

According to another feature of the present invention, the shape attribute $\psi_m$ may be determined by the transformation:

$$\psi_m = \sqrt[m]{\frac{1}{\overline{\rho^m}}}.$$

According to another feature of the present invention, the number F of the plurality of F shape attributes $\psi_m$ may be determined from at least 29 samples per class of the classification system, wherein the number F is increased until the values for the shape attributes $\psi_m$ obtained for the samples of one class are different for at Least one shape attribute $\psi_m$ from the values of this shape attribute $\psi_m$ of the other classes.

According to another feature of the present invention, the errors of cast parts may be associated to error classes defined in an industrial standard.

According to another feature of the present invention, the errors of weld seams may be associated to error classes defined in an industrial standard.

According to another feature of the present invention, objects reproduced on paper may be recognized as letters.

According to another feature of the present invention, objects reproduced on paper may be recognized as tones in a musical score representation.

The invention is based on the concept of determining for the image to be analyzed a predetermined number of numerical shape attributes $\psi_m$ wherein m is a running index having values from 1 to F, wherein $\psi_m$ is a transformed expression of the dimensionless, scaled, normalized, centralized, polar moment $\overline{\rho^m}$. For associating the content of the digital image, these mutually independent shape attributes $\psi_m$ can be compared with values for these shape attributes saved in a table. If the values of all determined F shape attributes $\psi_m$ are identical to the F shape attributes $\psi_m$ saved in the table, then the image content of the analyzed image belongs to this class. Because of the digitization, it is preferable to work with approximate values, so that a class association is already displayed when the computed F shape attributes $\psi_m$ agree approximately with the saved F shape attributes $\psi_m$.

Unlike the conventional method which is limited to 7 shape attributes, the numerical shape attributes $\psi_m$ proposed for image analysis in the present invention are independent of each other in such a way that a large number of shape attributes can be defined, without creating an interdependence of the shape attributes. In this way, an unambiguous association of the image contents to be recognized with a predetermined class can be achieved.

In particular, the method of the invention is independent of the relative position of the content to be recognized with respect to the acquisition device. Even objects rotated by, for example, 60° or 180° can be uniquely associated.

The method is based on computing is sequence of F functionally independent, dimensionless attributes of the separated, limited content in the presented image.

The image is conventionally represented by N pixels, wherein a pixel in a predetermined coordinate system is located at the position $(x_i, y_j)$ and the image extends from the coordinates $(0, 0)$ to $(x_{imax}, y_{jmax})$ and imax is the maximum number of pixels in the direction of the x-coordinate and jmax is the maximum number of pixels in the direction of the y-coordinate, and wherein a content attribute data [j, i] is associated with each pixel.

The content attribute for a binary image, where the corresponding image pixel content assumes, for example, the value 1 or 0 for black or white, is for example a single value saved in a table, and data [j,i] is representative for the value in this table at the position associated with the pixel. In color images, where the content attribute of each pixel is composed, for example, of three values for the 3 color representation "red, green, blue" (RGB representation), the content attribute data [j,i] is, for example, representative of a vector which has these three values for the respective pixel. Data [j,i] can also be representative of other vectors, if other color representations are used, e.g., grayscale representations. Data [j,i] can also be representative of the magnitude of such vector, when a multi-color representation is converted from a multi-color representation, for example an RGB representation, into a grayscale or even a binary representation before employing the classification method of the invention.

In a color representation, for example an RGB representation, data [j,i] can also represent the individual value of the red representation, or the green representation, or the blue representation in the pixel. The classification method is then performed, for example, exclusively based on one representation, for example the red representation, whereby the method is here performed identical to the preceding method for binary representations. In this case, binary values 1 and 0 can also be used for data [j,i] at the pixel, wherein for example 1 indicates red and 0 empty. The classification method can also be performed in parallel for the different color representations, i.e., in parallel for a binary red representation, a binary green representation and a binary blue representation. This increases the accuracy of the classification.

The moment $\overline{\rho^m}$ transformed into the numerical shape attribute $\psi_m$ is computed from $$\overline{\rho^m} = k_m \overline{R^m}$$

with $k_m = \frac{(m+2)}{2}\left(\frac{\pi}{|A|}\right)^{\frac{m}{2}}$ $$A = m_{0,0} = \Delta a * \Delta b * \sum_{j=1}^{jmax}\sum_{i=1}^{imax} \text{data}[j, i]$$

$$\overline{R^m} = \frac{v_m}{v_0} = \frac{v_m}{m_{0,0}}$$

$$v_m = \Delta a * \Delta b * \sum_{j=1}^{jmax}\sum_{i=1}^{imax} (R(j, i))^m \text{data}[j, i]$$

$$R(j, i) = \sqrt{((i-0,5)*\Delta a - \overline{x})^2 + ((j-0,5)*\Delta b - \overline{y})^2}$$

$$\overline{x} = \frac{m_{1,0}}{m_{0,0}}$$

$$\overline{y} = \frac{m_{0,1}}{m_{0,0}}$$

$$m_{1,0} = (\Delta a)^2 * \Delta b * \sum_{j=1}^{jmax}\sum_{i=1}^{imax} (i-0,5)*\text{data}[j, i]$$

-continued $$m_{0,1} = (\Delta b)^2 * \Delta a * \sum_{j=1}^{jmax}\sum_{i=1}^{imax} (j-0,5)*\text{data}[j, i]$$

$\Delta a$=width of the pixel in the x-coordinate direction, $\Delta b$=width of the pixel in the y-coordinate direction, data [j, i]=content attribute of the pixel at the position $(y_j, x_i)$ m=a sequential number from 1 to F.

In a particularly preferred embodiment, the predetermined coordinate system is a Cartesian coordinate system, because the majority of digital images defines the pixels with reference to a Cartesian coordinate system. However, other coordinate systems, for example polar coordinates systems, can also be employed.

While presently digital images can be rendered typically with between 1 and 3 million image dots (pixels), it can be expected that the number N will increase with advances of image acquisition and image processing techniques, so that the afore-described sum functions will approach integral functions.

More particularly, an image content is defined by the arrangement of pixels having the same content attribute.

The F determined shape attributes of the image content define an attribute vector in a limited, F-dimensional attribute space (unit hypercube). The content classification occurs by problem-specific clustering of this n-dimensional.

The classification system can be, for example, a predetermined industry standard, for example EN 1435. For identification of persons, for example, each person can form an individual class. In this case, the F shape attributes $\psi_m$ representative of the fingerprint or the iris image of the person to be identified are then saved in the comparison table. For identification of persons, the image of the iris acquired by the image acquisition unit, for example a camera, is analyzed with the method of the invention, whereby the F shape attributes $\psi_m$ of the recorded iris are computed and compared with the shape attribute values saved in the table. If there is an (approximate) agreement with all values of the shape attributes $\psi_m$ of a class, then the system has recognized the person characterized by this class. Preferably, a least-squares method, for example a method according to Gauss, can be used to establish the approximate agreement.

If a digital image is recognized that is represented in a representation different from a binary representation, then the aforementioned method steps can be performed for several groups with F numerical shape attributes $\psi_m$, for example, for one group for values of a red representation, for one group for values of a green representation, and for one group for values of a blue representation. Alternatively, the aforementioned method steps can also be performed on content attributes data [j,i] which contain the individual values of the individual color representations as a vector. Computational division operations are then preferably performed on the magnitudes of the vectors.

In a preferred embodiment, the shape attribute $\psi_m$ is determined by the transformation $$\psi_m = \sqrt[m]{\frac{1}{\overline{\rho^m}}}.$$

However, other transformations as can also be used to transform $\psi_m$ to $\overline{\rho_m}$, and $\psi_m$ may even be $\overline{\rho}^m$.

The shape attribute to be compared with the values stored in the table is preferably the shape attribute $\psi_m$ obtained with the aforementioned transformation. Before the comparison with the table values or in the transformation from $\overline{\rho}^m$, the sequential order of the F shape attributes can be subjected to an orthogonalization method, for example as performed in E. Schmidt. In this approach, the shape attributes to be compared can be recomputed so as to yield for a circle a sequence of F shape attributes $\psi_1, \psi_2, \psi_3, \psi_4, \psi_5 \ldots \psi_F$ with values of 1, 0, 0, 0, 0 . . . 0.

For defining the number F of the numerical shape attributes $\psi_m$, the number F can be increased, starting with F=1, from several, in particular more than 29 samples per class of the classification system, until the values for the respective shape attribute $\psi_m$ determined for the samples of a class are different in at least one numerical value for at least one shape attribute $\psi_m$ from the numerical value of this shape attribute $\psi_m$ of the other class. In a particularly preferred embodiment, the number F of the shape attributes is increased until the values of the shape attributes with the highest ordinal numbers m in all classes decrease with increasing ordinal number. The values of the corresponding shape attribute $\psi_m$ determined for the at least 29 samples per class can be arithmetically averaged in order to determine a value to be inserted for this class for this shape attribute.

The table reproduced below, which is intended only to illustrate the freely selected numerical values, shows that for determining the weld seam error in relation to the error classes "tear", "pore", "tubular pore", a number F=1 of the numerical shape attributes $\psi_m$ is not sufficiently precise, because $\psi_1$ assumes almost identical values for the tear class as for the tubular pore classes. The association only becomes unique by including the second numerical shape attribute $\psi_2$. As can be seen, in spite of the similar numerical values for $\psi_2$ in the class "pore" and "tubular pore", this system consisting of only two shape attributes $\psi_1, \psi_2$ is suitable to precisely classify the 3 errors.

|  | Tear | Pore | Tubular pore |
| --- | --- | --- | --- |
| $\psi_1$ | 0.01245 | 0.87231 | 0.01268 |
| $\psi_2$ | 0.00234 | 0.54100 | 0.54612 |

The number F can also be determined by a method based on a rotational ellipse. Such "Cluster Methods" are described, for example, in H. Niemann, Klassifikation von Mustern (*Pattern Classification*), Springer Verlag, Berlin, 1983, page 200ff.

The method of the invention for associating the content of a digital image with a class of a classification system is employed preferably in the optical inspection of components, in particular in optical surface inspection. The method can also be used in quality assurance, texture, shape and contour analysis, photogrammetry, symbol and text recognition, personnel recognition, robotic vision or evaluation of radiographic or radioscopic images, ultrasound images and nuclear spin tomography.

It is thereby unimportant if the images having objects to be recognized are "optical" images in the spectral range of visible light or radiographic or radioscopic images, or even synthetic images from the technical field Imaging. The method can therefore be used in the field of optical surface inspection as well as in quality assurance, texture, shape and contour analysis, photogrammetry, symbol and text recognition, personnel recognition, robotic vision or evaluation of radiographic or radioscopic images, ultrasound images and nuclear spin tomography.

When a concrete problem of object recognition is approached in the context of this broad range of possible applications, then the degree of complexity of the problem is defined from the beginning:

It is known into how many different object classes K the objects to be recognized are to be sorted. Unlike with classification based on heuristic attributes, in the new algorithmic method the number of degrees of freedom of the shape can be experimentally determined with respect to each object class based on a representative random sampling of test objects. The classification is performed exclusively with attribute vectors $\psi=(\psi_1, \psi_2, \psi_3, \psi_4, \psi_5, \ldots, \psi_F)$. The attribute vector of an arbitrary separated, limited, two-dimensional object in the image is located inside a limited, normalized F-dimensional subarea ("unit hypercube") of an F-dimensional attribute space. The pattern classification is performed by a problem-specific clustering of the interior of this F-dimensional unit hypercube.

BRIEF DESCRIPTION OF THE DRAWING

The invention will now be described with reference to a drawing depicting a single exemplary embodiment. It is shown in.

DETAILED DESCRIPTION OF A PREFERRED EMBODIMENT

Figure 1:
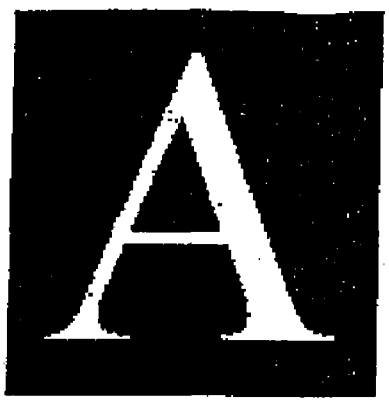
FIG. 1 three different representations of a first symbol to be recognized.
Figure 1:
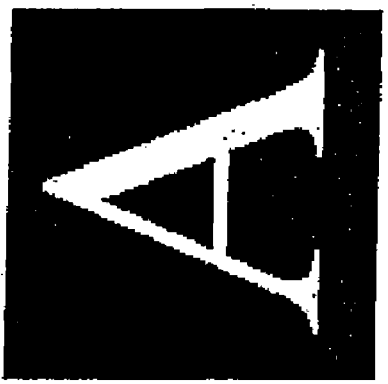
Figure 1:
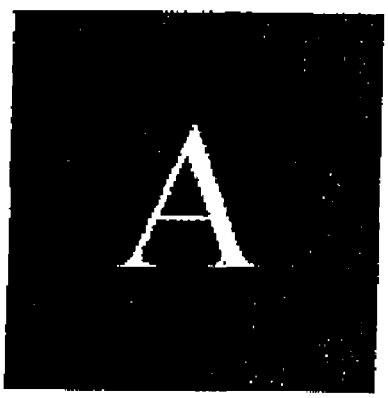
Figure 2:
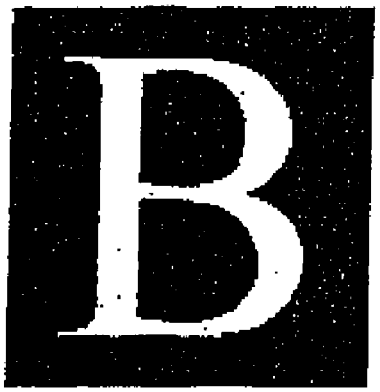
FIG. 2 three representations of a second symbol to be recognized.
Figure 2:
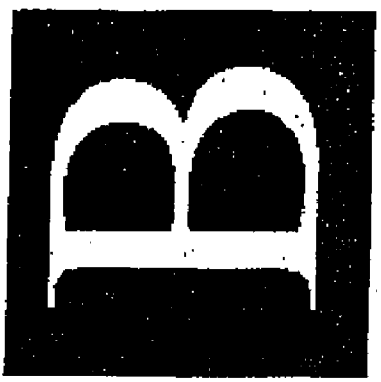
Figure 2:
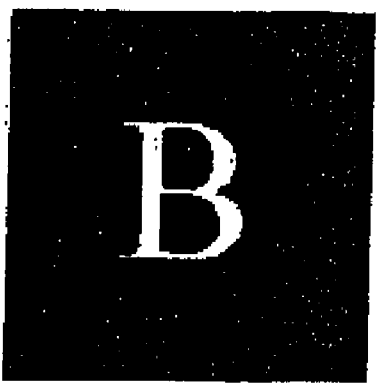
Figure 3:
FIG. 3 three representations of a third symbol to be recognized.
Figure 3:
Figure 3:
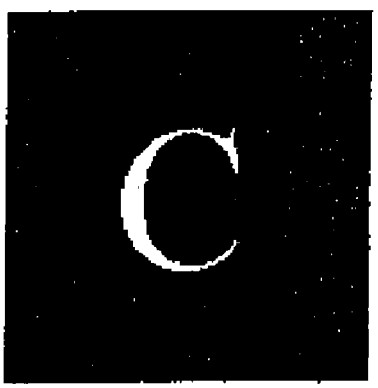

FIGS. 1, 2 and 3 show the letters A, B, and C in three representations i) normal, ii) normal, but rotated by 90°, iii) same orientation as normal, but smaller. In addition to the central orientation depicted in the Figures, positioning to the left and positioning to the right were also investigated.

The following Table shows the values for $\psi_1$, wherein $\psi_1$ is computed from the relation $$\psi_1 = \sqrt{\frac{1}{\overline{\rho}^1}}.$$

$\overline{\rho}^1$ is obtained from the following relationships:

$$\overline{\rho}^1 = k_1 \overline{R^1}$$

with $k_1 = \frac{3}{2}\left(\frac{\pi}{|A|}\right)^{\frac{1}{2}}$ $$A = m_{0,0} = \Delta a * \Delta b * \sum_{j=1}^{jmax} \sum_{i=1}^{imax} \text{data}[j, i]$$

$$\overline{R^m} = \frac{v_m}{v_0} = \frac{v_m}{m_{0,0}}$$

-continued $$v_m = \Delta a * \Delta b * \sum_{j=1}^{jmax} \sum_{i=1}^{imax} (R(j,i))^m \text{data}[j,i]$$

$$R(j,i) = \sqrt{((i-0,5)*\Delta a - \overline{x})^2 + ((j-0,5)*\Delta b - \overline{y})^2}$$

$$\overline{x} = \frac{m_{1,0}}{m_{0,0}}$$

$$\overline{y} = \frac{m_{0,1}}{m_{0,0}}$$

$$m_{1,0} = (\Delta a)^2 * \Delta b * \sum_{j=1}^{jmax} \sum_{i=1}^{imax} (i-0,5)*\text{data}[j,i]$$

$$m_{0,1} = (\Delta b)^2 * \Delta a * \sum_{j=1}^{jmax} \sum_{i=1}^{imax} (j-0,5)*\text{data}[j,i]$$

$\Delta a$ = width of the pixel in the $x$-coordinate direction $= \Delta a = 0.3175$ mm $\Delta b$ = width of the pixel in the $y$-coordinate direction $= \Delta b = 0.3175$ mm data $[j,i]$ = content attribute of the pixel at the position $(y_j, x_i)$.

With the afore-described relationship and the respective data fields for the respective representations, where content attributes are saved at the positions $(y_j, x_i)$, the values reproduced in the following table are obtained:

| Table of the numerical values for the shape attribute $\psi_1$ | | | | |
|---|---|---|---|---|
| Letter | Position | Magnitude | Orientation | Attribute $\psi_1$ |
| A | left | 96 | normal | 0.576 |
| A | centered | 96 | normal | 0.576 |
| A | right | 96 | normal | 0.576 |
| A | left | 96 | 90° rotated | 0.574 |
| A | centered | 96 | 90° rotated | 0.574 |
| A | right | 96 | 90° rotated | 0.574 |
| A | left | 48 | normal | 0.569 |
| A | centered | 48 | normal | 0.569 |
| A | right | 48 | normal | 0.569 |
| B | left | 96 | normal | 0.609 |
| B | centered | 96 | normal | 0.609 |
| B | right | 96 | normal | 0.609 |
| B | left | 96 | 90° rotated | 0.608 |
| B | centered | 96 | 90° rotated | 0.608 |
| B | right | 96 | 90° rotated | 0.608 |
| B | left | 48 | normal | 0.598 |
| B | centered | 48 | normal | 0.598 |
| B | right | 48 | normal | 0.598 |
| C | left | 96 | normal | 0.445 |
| C | centered | 96 | normal | 0.445 |
| C | right | 96 | normal | 0.445 |
| C | left | 96 | 90° rotated | 0.444 |
| C | centered | 96 | 90° rotated | 0.444 |
| C | right | 96 | 90° rotated | 0.444 |
| C | left | 48 | normal | 0.443 |
| C | centered | 48 | normal | 0.443 |
| C | right | 48 | normal | 0.443 |

As can be seen, the value $\psi_1$ for the letter A assumes values of about 0.57, for the letter B values of about 0.6, and for the letter C values of about 0.44. A previously defined symbol can therefore be uniquely recognized with the method of the invention independent of the actual position and size of the letter.

What is claimed is:

1. A method for associating the content of a digital image with a class of a classification system, wherein the image is represented by N pixels, each pixel being located at the position $(x_i, y_j)$ in a predetermined coordinate system, said image extending from the coordinates $(0, 0)$ to $(x_{imax}, y_{jmax})$ and imax being the maximum number of pixels in the direction of the x-coordinate and jmax is the maximum number of pixels in the direction of the y-coordinate and wherein at least one numerical content attribute data $[j, i]$ is associated with each pixel, said method comprising the steps of:

determining at least one group of a predetermined number of F numerical shape attributes $\psi_m$ with m as a running index, wherein $\psi_m$ is a transformed expression of the moment $\overline{\rho^m}$, and $\rho^m$ is derived from $$\overline{\rho^m} = k_m \overline{R^m}$$

with $k_m = \frac{(m+2)}{2} \left(\frac{\pi}{|A|}\right)^{\frac{m}{2}}$ $$A = m_{0,0} = \Delta a * \Delta b * \sum_{j=1}^{jmax} \sum_{i=1}^{imax} \text{data}[j,i]$$

$$\overline{R^m} = \frac{v_m}{v_0} = \frac{v_m}{m_{0,0}}$$

$$v_m = \Delta a * \Delta b * \sum_{j=1}^{jmax} \sum_{i=1}^{imax} (R(j,i))^m \text{data}[j,i]$$

$$R(j,i) = \sqrt{((i-0,5)*\Delta a - \overline{x})^2 + ((j-0,5)*\Delta b - \overline{y})^2}$$

$$\overline{x} = \frac{m_{1,0}}{m_{0,0}}$$

$$\overline{y} = \frac{m_{0,1}}{m_{0,0}}$$

$$m_{1,0} = (\Delta a)^2 * \Delta b * \sum_{j=1}^{jmax} \sum_{i=1}^{imax} (i-0,5)*\text{data}[j,i]$$

$$m_{0,1} = (\Delta b)^2 * \Delta a * \sum_{j=1}^{jmax} \sum_{i=1}^{imax} (j-0,5)*\text{data}[j,i]$$

wherein $\Delta a$=width of the pixel in the x-coordinate direction, $\Delta b$=width of the pixel in the y-coordinate direction, data $[j, i]$=content attribute of the pixel at the position $(y_j, x_i)$ m=a number running from 1 to F as a counter of the shape attributes;

comparing the value of each shape attribute of the F numeric shape attributes intended for the picture in the at least one group with the value saved in a table for the respective shape attribute of this group, wherein values for the individual numerical shape attributes of this group in the table are associated with each class; and outputting the class as an association class in which the image to be recognized is classified, in which the F numeric shape attributes intended for the picture best correspond to the values of the numeric shape attributes recorded in the table for this class.

2. The method of claim 1 wherein the shape attribute $\psi_m$ is determined by the transformation $$\psi_m = \sqrt[m]{\frac{1}{\rho^m}}.$$

3. The method of claim 1, further comprising the step of determining the number F of the numeric shape attributes $\psi_4$ from at least 29 samples per class of the classification system, wherein the number F is increased until the values for the shape attributes $\psi_m$ obtained for the samples of one class are different for at least one shape attribute $\psi_m$ from the numerical values of this shape attribute $\psi_m$ of the other classes.

4. The method of claim 1, further comprising the steps of associating errors of cast parts to error classes defined in an industrial standard, and generating the digital image by radioscopy.

5. The method of claim 1, further comprising the steps of associating errors of weld seams to error classes defined in an industrial standard, and generating the digital image by radioscopy.

6. The method of claim 1, further comprising the steps of associating objects reproduced on paper to classes defined for objects reproduced on paper, and generating the digital image with a scanner.

7. The method of claim 6, wherein said classes are defined for objects that include elements of a text.

8. The method of claim 6, wherein said classes are defined for objects that include elements of a musical score.

9. The method of claim 1, wherein individual values of individual color representations are included in content attributes data [i, j] as a vector.

10. The method of claim 1, further comprising the step of a parallel execution of said steps of determining, comparing and outputting for an image having more than a binary representation, so that each of said parallel executions provides a respective class for a respective representation of the image.

11. The method of claim 1, further comprising the step of generating an optical image as the digital image.

12. The method of claim 1, further comprising the step of generating an image of a person and a least squares method is used to determine whether the person has been recognized.

13. The method of claim 12, wherein the image of a person is an image of a fingerprint.

14. The method of claim 12, wherein the image of a person is an image of an iris.

15. The method of claim 1, further comprising the step of repeating said steps of determining, comparing and outputting for an image having more than a binary representation, so that each repetition provides a respective class for a respective representation of the image.

16. The method of claim 1, further comprising the step of determining the number F of the numeric shape attributes $\psi_m$ using a rotational ellipse.

17. The method of claim 1, further comprising the step of generating an optical image as the digital image.

18. The method of claim 10, wherein the optical image is an optical image of the surface of a component.

19. The method of claim 1, further comprising the step of generating a radioscopic image as the digital image.

20. The method of claim 1, further comprising the step of generating an ultrasound image as the digital image.

21. The method of claim 1, further comprising the step of generating a nuclear spin tomography image as the digital image.

22. The method of claim 1, further comprising the step of generating a synthetic image as the digital image.

* * * * *

UNITED STATES PATENT AND TRADEMARK OFFICE
CERTIFICATE OF CORRECTION

| | | |
|---|---|---|
| PATENT NO. | : 7,876,964 B2 | Page 1 of 1 |
| APPLICATION NO. | : 11/574698 | |
| DATED | : January 25, 2011 | |
| INVENTOR(S) | : Günther Coen | |

It is certified that error appears in the above-identified patent and that said Letters Patent is hereby corrected as shown below:

[73] Assignee:

Line 3: Replace "Forshung" with the correct --Forschung--.

Signed and Sealed this
Twenty-ninth Day of March, 2011

David J. Kappos
*Director of the United States Patent and Trademark Office*